June 6, 1950     R. H. STEWART, JR., ET AL     2,510,151
SAFETY SYSTEM FOR MINE HOISTS
Filed May 18, 1948     7 Sheets-Sheet 2
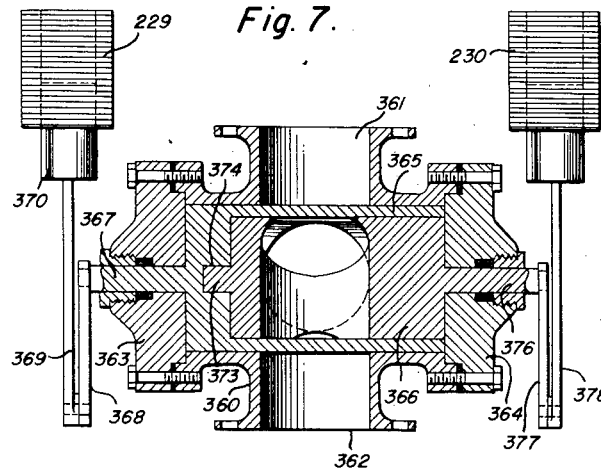
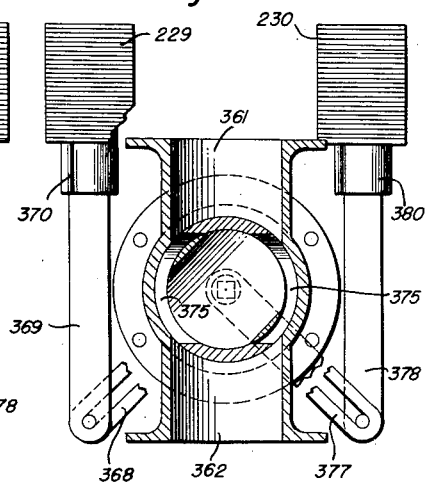
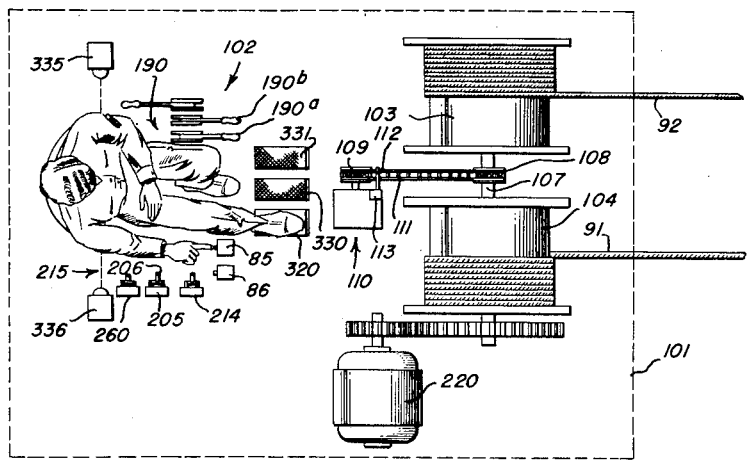
Ralph H. Stewart, Jr.
Harvey T. Stewart
              INVENTORS June 6, 1950     R. H. STEWART, JR., ET AL     2,510,151
SAFETY SYSTEM FOR MINE HOISTS
Filed May 18, 1948     7 Sheets-Sheet 3

Ralph H. Stewart, Jr.
Harvey T. Stewart
    INVENTORS

BY *(signatures)*
    Attorneys

June 6, 1950  R. H. STEWART, JR., ET AL  2,510,151
SAFETY SYSTEM FOR MINE HOISTS
Filed May 18, 1948  7 Sheets-Sheet 4
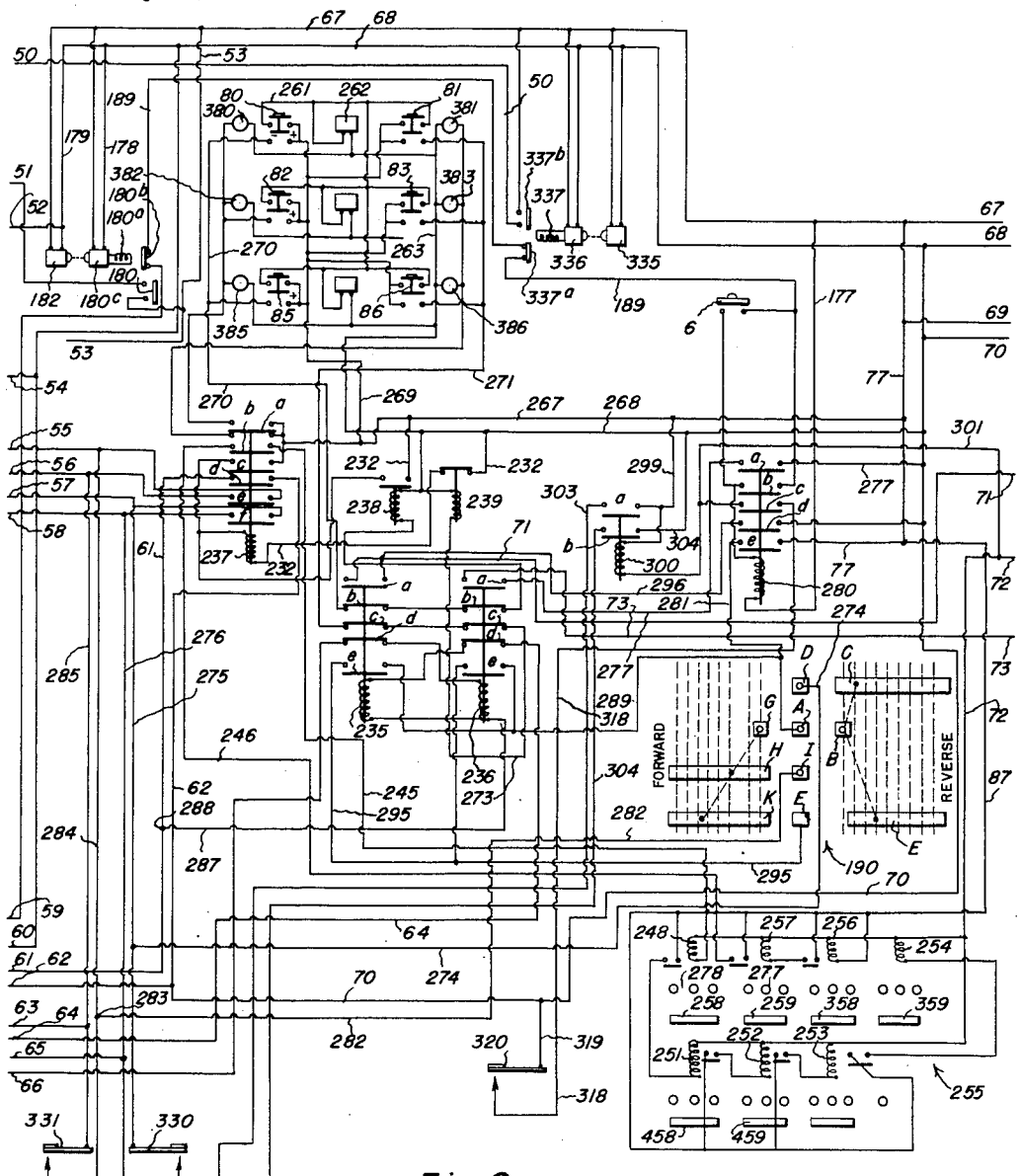
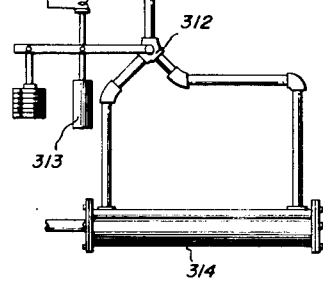
Fig. 9.
Ralph H. Stewart, Jr.
Harvey T. Stewart
INVENTORS
BY
*Clarence A. O'Brien*
*and Harvey B. Jackson*
Attorneys June 6, 1950 R. H. STEWART, JR., ET AL 2,510,151
SAFETY SYSTEM FOR MINE HOISTS
Filed May 18, 1948 7 Sheets-Sheet 5
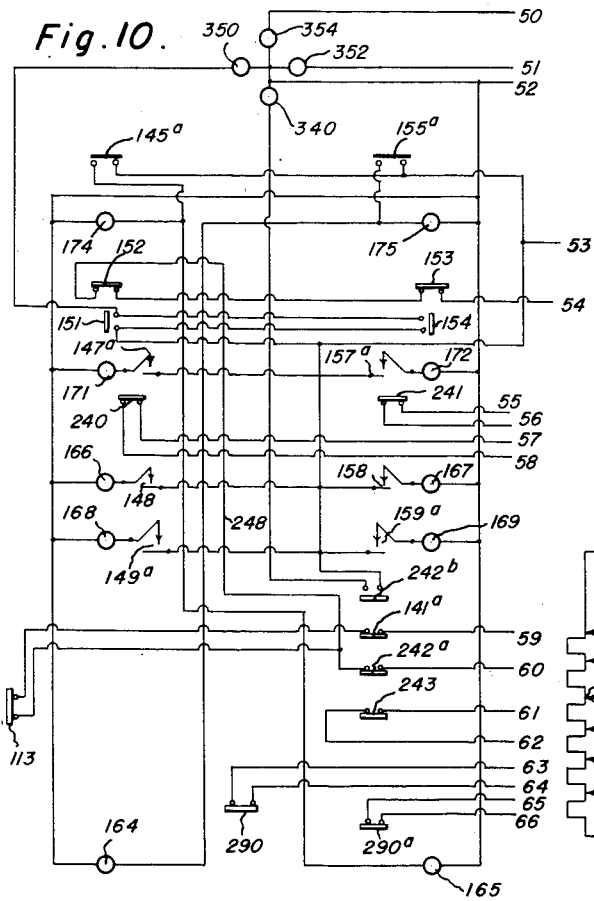
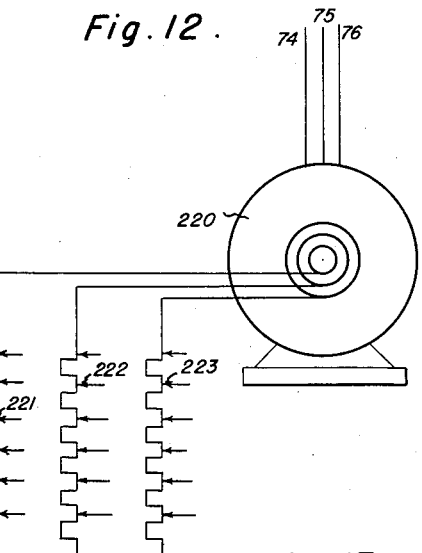
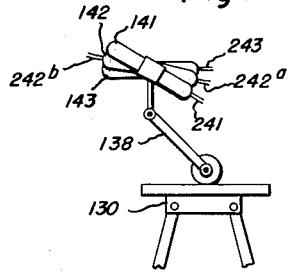
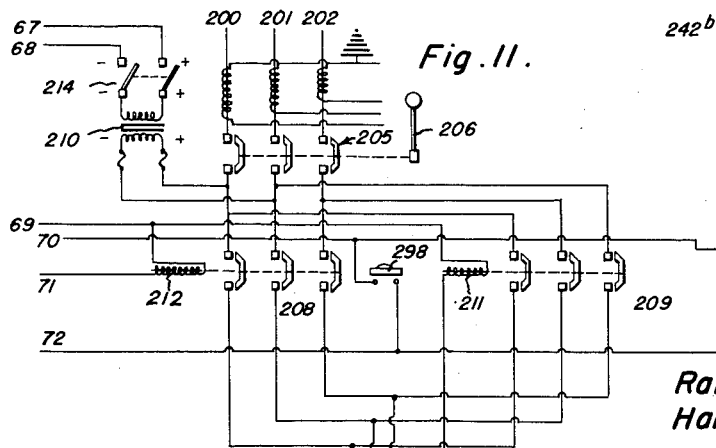
Ralph H. Stewart, Jr.
Harvey T. Stewart
INVENTORS
BY *Clarence A. O'Brien*
*and Harvey B. Jacobson*
Attorneys June 6, 1950  R. H. STEWART, JR., ET AL  2,510,151
SAFETY SYSTEM FOR MINE HOISTS
Filed May 18, 1948  7 Sheets-Sheet 7
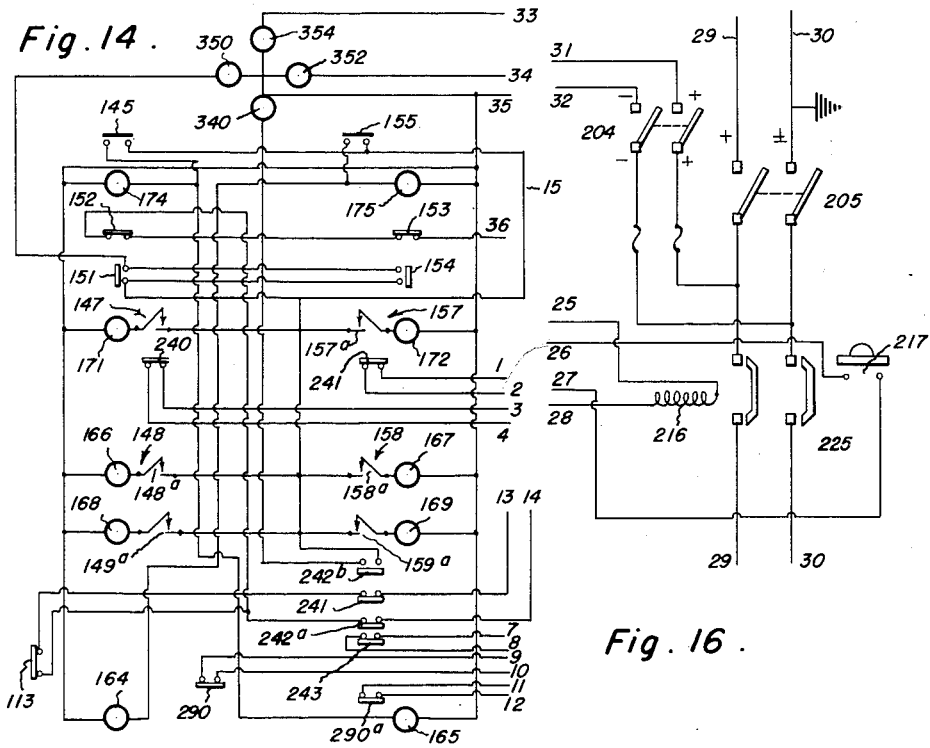
Fig. 14.
Fig. 16.
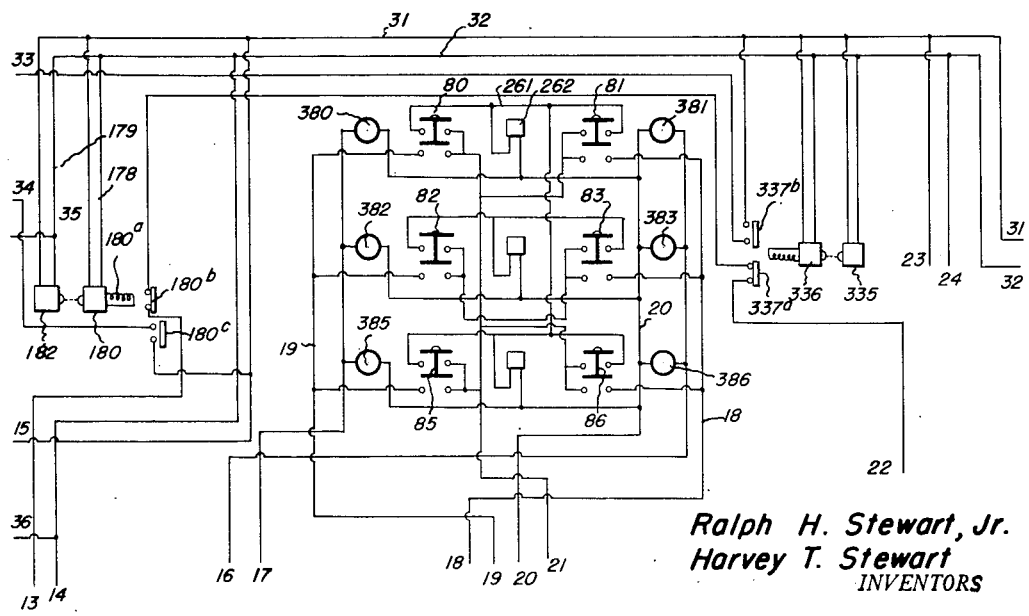
Fig. 15.
Ralph H. Stewart, Jr.
Harvey T. Stewart
INVENTORS
BY *[signatures]*
Attorneys Patented June 6, 1950

2,510,151

UNITED STATES PATENT OFFICE 2,510,151

SAFETY SYSTEM FOR MINE HOISTS

Ralph H. Stewart, Jr., Arnett, and Harvey T. Stewart, Glen Daniel, W. Va.

Application May 18, 1948, Serial No. 27,666

18 Claims. (Cl. 187—29)

This invention relates to safety control systems for mine hoists and similar apparatus and it has for its principal object to provide an automatic system for mine hoists with different types of operation, requiring different safety conditions which system relieves the operator from the duty to pay constant attention to the type of operation, and which with all types of operation automatically guards against over-speeding during the run, against overwinding, against excessive relative speed or approach speed with respect to limit or stop positions, against the failure of power and against a failure of the operator due to his physical condition, such as sudden spells of illness or fainting.

In order to understand more clearly the objects of the invention it may first be mentioned that mine hoists are frequently operated with different speeds and also with different position limits, according to the load hauled by the cars or cages, which sometimes consist of materials, such as supplies, ores, coal or the like, but sometimes consist of persons using the cage for transportation. Different safety rules apply in these cases and the cars or cages have to operate with different speeds. Moreover different limits for the run are used in most cases as the cars or cages hauling material have as a rule to run to a point where the car or cage is tilted to dump the load into chutes; while obviously cars or cages hauling persons have upper limit stops which are below this point. Moreover materials or supplies are frequently hauled to a high storage point while persons alight on the ground floor. Finally the cages or cars are mostly coupled so as to counterbalance each other and therefore the limit stops are not regularly the same, as for instance in the case of a car or cage taking persons for a descent from the uppermost floor such as the ground floor, which may be the limit stop for persons; the limit stops cannot be shifted automatically to the stops forming the limits for person transportation, because the second car connected with the downgoing car has to go up beyond this limit to allow descent to the lowest point.

According to the invention, therefore high speed and low speed operation as well as the application of the proper limits for the run are regulated by means of an automatic safety controller and indicator which contains a member reproducing the movement of the cars or cages and which moreover contains all the switches which regulate the movement of the hoisting drums, whether they are driven by steam or by an electric motor. These switches according to the invention are divided into two groups, one group consisting of switches either indicating or limiting the run of the car which, in the case that an attempt is made to make the car travel beyond the limit position, stop the driving means of the drum. A second group of switches is mainly operative as a speed controller stopping the operation when the limit speed is exceeded or when the safe speed is exceeded in the vicinity of a stop, thus preventing overrunning and damage to the cage.

Accordingly it is a general object of the invention to provide a control system which may be regulated by the operation of a number of switches, and in providing a controller which operates the said switches in accordance with the position of the car and in accordance with the speed and limit stop conditions under which the hauling takes place.

It is a further object of the invention to provide a number of interlocked control circuits, which are controlled by the above named switches, but the interlocking of which may be changed with the selected speed and limit conditions of the haul.

It is a further object of the invention to make speed and stop limit selection automatic to the highest possible degree, so that selection may simply take place by pressing one of a number of button switches, said switches preparing the circuits for the desired interlocking and operation. Clearly such a simple selection may not only be made by the operator but may also be made by the persons giving the signals to the operator and notifying him that hauling at a certain speed is desired. Therefore the task of the operator is largely simplified as the call made by means of the call button switches also prepares the circuits for a run under the selected conditions.

A further object of the invention consists in controlling certain switches by means of the speed acquired by the car or cage, said control being exercised at different absolute speed in accordance with the maximum speed allowed for the individual haul.

A further object of the invention consists in controlling said speed limit switches in a group successively, the individual speed limit switch which becomes operative being selected by the original call or the original selective setting of the circuits for the individual haul.

A further object of the invention consists in providing in addition to these speed limit switches, further speed limit switches at certain points near the limits which cooperate with the above named speed limit switches and regulate the approach speeds, which must be smaller than the lowest speeds prescribed by the group of speed limit switches.

A still further object of the invention consists in making the entire operation dependent on the energization of a master relay controlling its own energizing circuit, and in placing all the emergency contacts and appliances supervising the correct function and stopping the hoisting operation in the event of unsafe conditions in this circuit.

It is a further object of the invention to provide in addition to the limit switches a final limit control by means of a photo-electric cell, arranged in and cooperating with the safety controller and operated by the indicating element of said controller, the control being exercised by a switch in the energizing circuit of the master relay.

It is a further object of the invention to guard against any lack of correspondence between the drum hoisting the cars or cages and the movable element reproducing this motion of the cars or cages in the controller by a special feeler associated with a switch in the energizing circuit of the master relay, said feeler being dependent on the means for transmitting motion to the movable safety controller element.

It is a further object of the invention to control the presence and the position of the operator by means of a photocell arrangement energized by means of a beam intercepted by the operator, the said photocell arrangement controlling again the locked energizing circuit of the master relay.

Further more specific objects of the invention will be explained in the following detailed specification.

The invention is illustrated in the accompanying drawings showing two embodiments thereof. It is however to be understood that the invention is merely described by way of example in order to explain the principle on which it is based and the best modes of applying this principle in specific cases. The information for the expert skilled in the art provided in the specification permits application of said principle to other cases not specifically described and modifications of the embodiments illustrated are therefore not necessarily departures from the invention.

In the drawings:

Figure 2 is a plan view of the control house with the operator on his seat.

Figures 7 and 8 are sectional elevational views of the steam valve used in one of the two modifications, the sections being taken along the median planes of symmetry at right angle to each other.

Figures 9, 10 and 11 are to be considered as a single diagrammatic figure joined at the points provided with identical reference letters. These three figures when joined show a complete diagram of connections of the safety hoist arrangement.

Figure 12 is a diagrammatic view of the electric motor used in connection with the hoist with its resistances.

Figures 13, 14, 15 and 16 are again to be considered as a single diagram joined at the points provided with identical reference letters. These figures illustrate a complete diagram of connections of a second modification of the safety hoist.

Figure 17 is a diagrammatic view of the speed control mercury switches operated by the governor.

Figure 1:
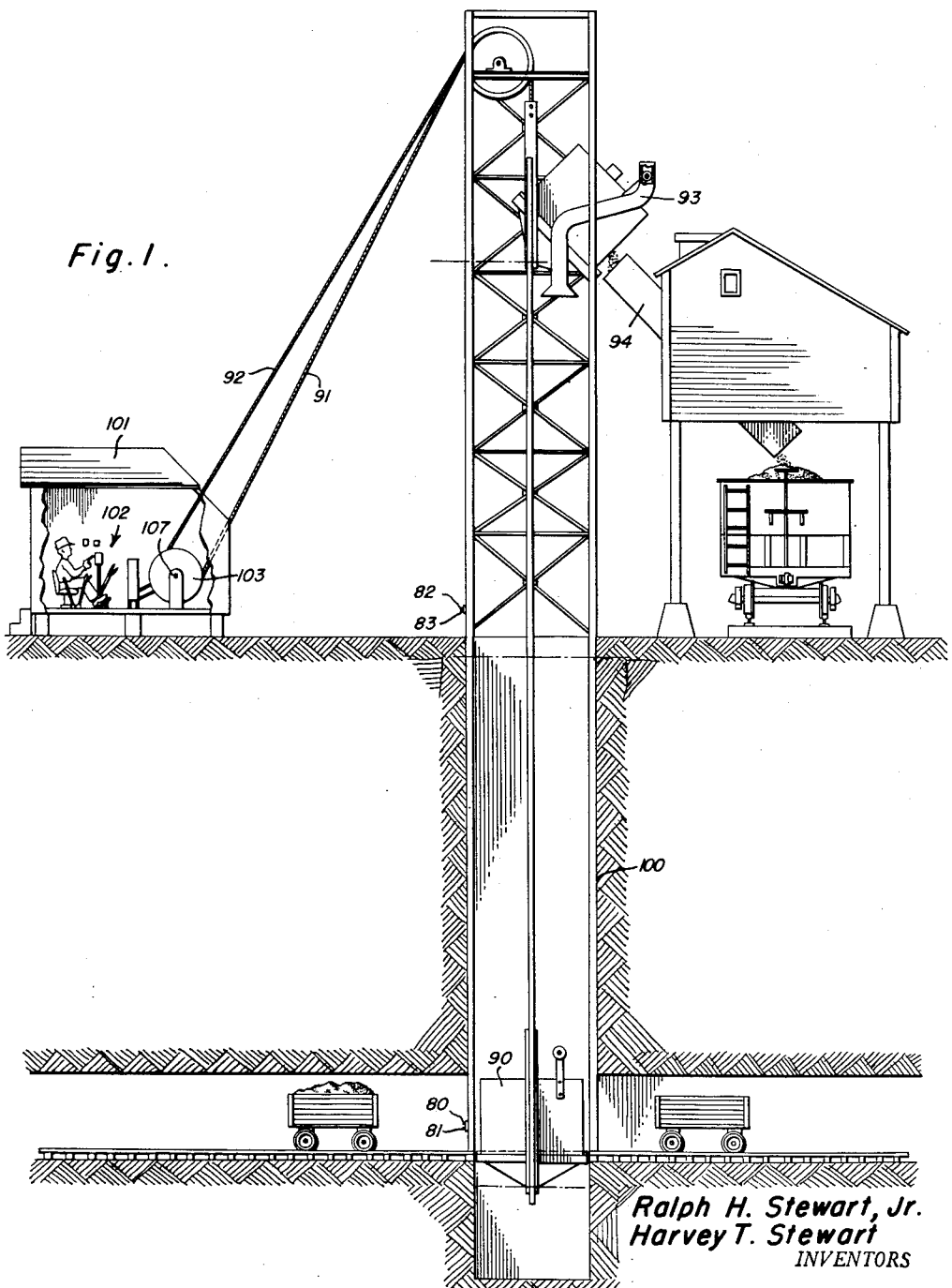
Figure 1 is a diagrammatic view of a mine shaft, car and control house with the operator, illustrating the general arrangement.
Figures 3, 4, 5:
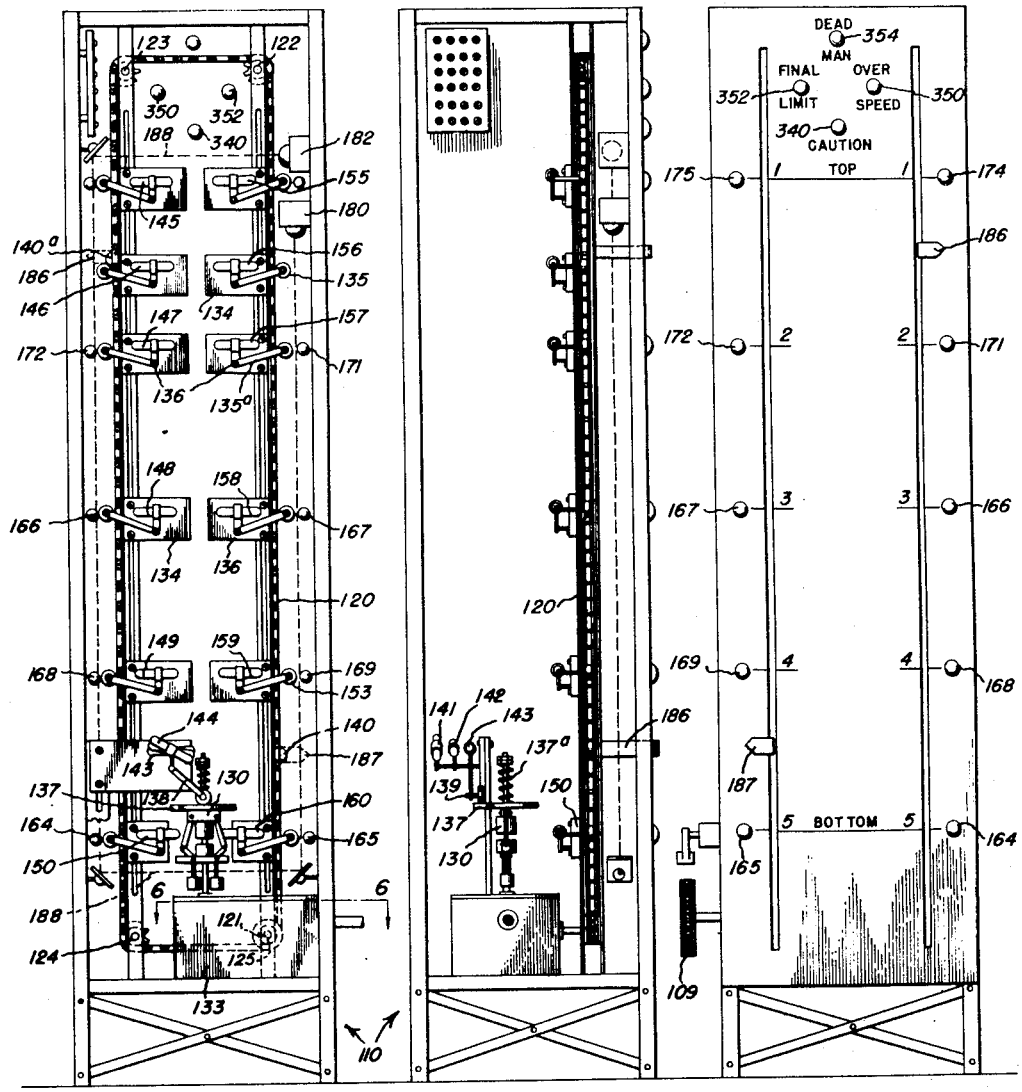
Figure 3 is an elevational side view of the circuit making and breaking section of the safety mechanism which is operated by means reproducing the movement of the car, with casing removed.
Figure 4 is an elevational side view of the same mechanism viewed at right angle to the view shown in Figure 3, without casing.
Figure 5 is a front elevation of the same mechanism in its casing.
Figure 6:
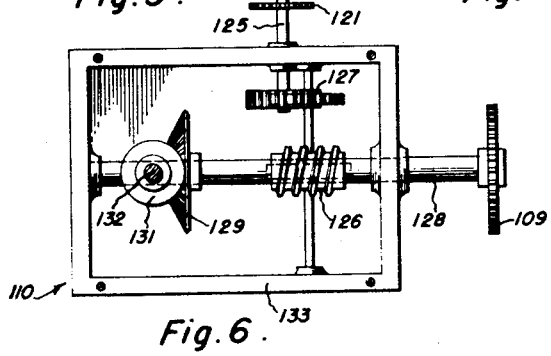
Figure 6 is a sectional plan view of the driving mechanism for the moving parts, reproducing the movement of the car, the section being taken along line 6—6 of Figure 3.
Figure 13:
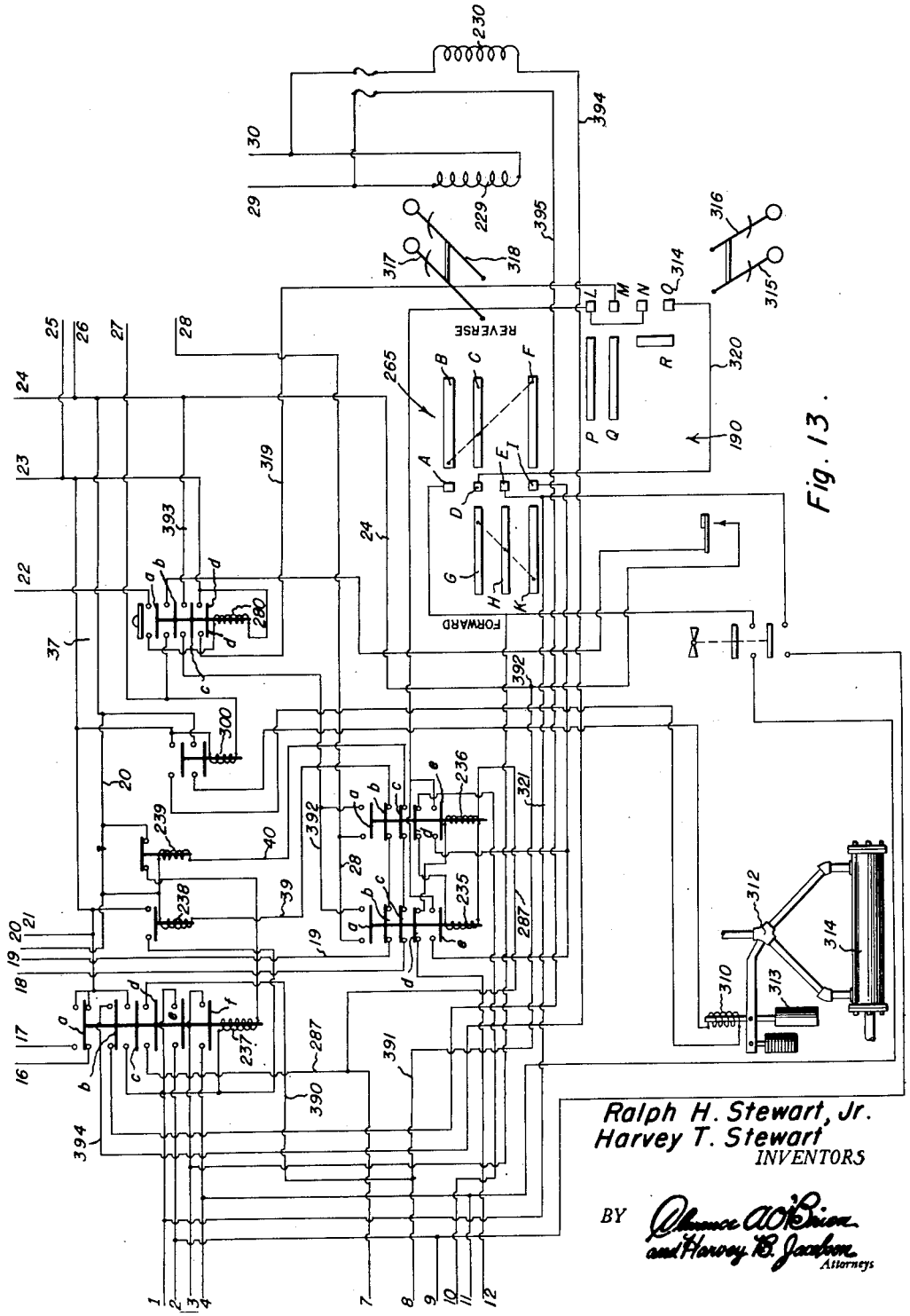

In the example illustrated in Figure 1 a general arrangement is shown to which the invention may be applied. The figure shows a shaft mine with a shaft 100 serviced by a pair or by a plurality of cages, loaded at the bottom of the shaft and hoisted to a point above ground where they automatically dump their load into a chute discharging it into railroad cars, into bunkers or the like. In such an installation it is customary that supplies or men are transported in the cages alternatively according to requirements. While loading of the case with passengers or with ores, coal or other minerals may occur at the same level, unloading has to occur at different levels, as the loads have to be discharged automatically at the top while men must have left the cage when such discharge occurs. Moreover safety rules for the transportation of loads and men are different and require the application of different speeds and of different safety devices.

The present invention fully protects against any hazardous conditions which may arise during the transportation of men or of loads and it also has to guard against errors, against failure of the operator to operate properly, against failure of the power supply or the like. Hazardous conditions against which the system protects are especially: overspeeding during the hoist, overwinding of the cables on the drums, approaching a landing with excessive speed, failure of power supply, collapse of the operator and the like. A special type of safety feature consists in safeguards against the consequences of a power failure consisting in a momentary deenergization of relays which control the operation, so that when the power supply is restored operation may not be resumed under conditions different from those to which the arrangement was set.

In general each cage 90 has its separate rope or cable 91, 92 wound on a drum 103, 104 respectively and has also its own automatic dumping means which as customary consists of a gooseneck 93 guiding and tilting the cage when it has reached a certain point on the shaft tower, so that it discharges its contents into the chute 94.

Signal or call buttons 80, 81, 82, 83 are provided on the ground and bottom landing and on any other intermediate landing or place where men or supplies have to be picked up. By means of these buttons the operator is notified that men or supplies are to be hoisted.

Referring now to the installation shown in Figures 2 to 6 of the drawings, 101 designates the hoist house with the operator's stand 102, the twin winding drums 103, 104 for the cables 91, 92 or of the two cages 90 which are supposed to move together in opposite directions, the electric motor 220 driving said twin drums by means of suitable gears and the safety control and indicator device 110 arranged in front of the operator and driven from the shaft 107 joining the two drums by means of sprockets 108, 109 and a chain 111. An arm 112 controls the tension of the chain and is connected with a switch 113, described below, operated when the slackness of the chain exceeds a certain degree or when the chain should break, in order to keep the safety control and indicator device in absolute correspondence with the movement of the drums and the position of the cages of the mine hoist and in order to warn the operator and prevent operation in the event of disorder or accident.

The operator's stand or seat is surrounded by a number of control levers, foot treadles and switch buttons. Among them may be mentioned the controller 190, which is of the customary type and which consists of a series of fixed segments A, D, E, I which may come into contact with a number of forward segments G, H, K and a number of reverse segments B, C, E. This controller is of the usual type and permits to bring either the forward or the reverse segments into contact with the fixed segments thus closing circuits controlling the motor as explained below.

Moreover the operator has two push buttons or other suitable switches 85, 86 for high and for low speed transportation which are used when the cage has to be moved between landings. Foot treadles 320, 330, 331 are moreover provided, one of which serves to energize the brake solenoid control relay and the brake solenoid, permitting the release of the brake independently of the controller and of other switches which control the release of the brake.

The two further treadles 330 and 331 are coupled mechanically and are used for a special purpose. When the hoist safety control is set for the transportation of men top limit contacts are used which allow the cages 90 to travel from the bottom of the mine to the ground landing which is the highest level landing for man. However when men are travelling downwardly from the ground landing to the bottom landing, one of the cages 90 has to travel upwardly above ground level on account of the coupling of the two cages. Therefore the top limit for transportation of men has to be cut out for the empty cage going up in this case, while the bottom limit controls and the other controls connected with the transportation of men remain switched in. In order to be able to remove the top limit for the said empty cage in this case, the foot treadles 330 and 331 are provided and are depressed by the operator when men are travelling down.

Associated with the push button switches are pilot lights and bells. The lights are not shown in Figures 1 and 2, but it will be clear that they indicate which push button switch has been pressed for operation and therefore whether the apparatus is set for hauling of supplies or of men.

Near the operator, moreover, the handle 206 for power supply switch 205 and a further handle (not shown) for control power switch 214 (Figure 11) is arranged. The former provides the power for the motor, the latter provides power for the control circuits, which power is derived from some of the main power conductors.

Moreover the operator is seated or stands in the path of a light beam 215 which is projected from an exciter lamp 335 to a photo-electric cell 336. The cell operates a relay 337 (Figure 9) which controls by means of contacts 337a, the energization of a relay 280, termed master relay on the energization of which the entire operation depends, as will be described below. A second pair of contacts 337b controls the circuit of an indicator lamp 354 over line 50 (Figure 9 and 10). The circuit controlling this relay also includes a second photo-electric device which will be described below and it includes the switch 113 operated by the feeler lever 112 which is influenced by the chain 111 as above described. This switch 113 (Figures 2 and 10) is normally closed when the chain has its normal tension but is opened when the chain is slack or breaks. A spring pressed or weighted feeler lever may be used for this purpose.

The safety control and indicator apparatus 110 arranged in front of the operator consists of a chest or housing supported by a suitable frame work 117 within which a chain 120 is running substantially in two vertical stretches moved in absolute conformity with the cages going up and down within the mine shaft. The chain 120 is running over sprockets 121, 122, 123, 124, one of which (121) is driven by means of a shaft 125 and by means of a worm gear 126 and of further gear wheels 127 from a shaft 128 which carries the sprocket wheel 109. The latter as above stated is driven by the shaft of the twin drums by means of chain 111 and sprocket 108. Thereby the rotation of the drums which determines the position of the cages in the shaft or above the shaft will be exactly reproduced on a reduced scale by the movement of the chain 120.

On the shaft 128 a bevel gear wheel 129 is arranged which drives either directly (as shown) or indirectly by means of gear wheels a further bevel gear 131 on a vertical shaft 132 which is the driving shaft of a centrifugal governor 130. The above described gear mechanisms may all be housed within a casing 133. Along the chains rails are arranged which are carrying blocks 134 on which mercury switches are mounted. The mercury switches are partly arranged for operation by means carried by the chain and partly for operation by the centrifugal governor. The switches operated by chain 120 are arranged in two groups 145—150 and 155—160 along the two vertical stretches. Their construction may be the customary construction of mercury switches held in a frame or carrier which is tiltable around a fulcrum 136 and is provided with a lever 135a projecting outwardly and carrying a roller 135 which may be engaged by cam members 140, 140a respectively mounted on the vertical stretches of the chain. The position of the cam member on the chain corresponds to that of a cage in or above the mine shaft.

Three of the mercury switches 141, 142, 143 form a group which is tiltable around a common axis formed by an axle 139 (Figure 17). These switches are however arranged at different angles with respect to the horizontal plane. A feeler 138 attached to the common wall reaches downwardly and is operated by a centrifugal governor 130. It will therefore be clear that these switches will be operated successively when the centrifugal governor 130 is operated and the feeler 138 is raised.

The centrifugal governor may be of any approved type, for instance of the fly ball type, comprising a number of weights or balls, thrown outwardly and attached to a sleeve supporting by the customary link system a slidable table 137 which is under the action of a spring 137a counterbalancing the centrifugal action of the balls. When the table 137 is lifted the feeler 138 is lifted with it and first switch 143, then switch 142, and finally switch 141 are tilted.

The switch 142 has fixed electrode contacts at both ends. All the switches control the speed with which the cage moves. Switch 143 is the low speed switch which limits the speed of the cage when hauling persons. Switch 142 is operated at a low speed which is used to control the speed of the cage when approaching the landings so that such an approach may not take place at excecessive speed. The third switch 141 finally is a high speed switch which permits the maximum speed of the cage, used when supplies, minerals, coal, ores, etc. are hauled but preventing an excess speed over a certain limit. This switch therefore stops the cage whenever a dangerous speed is attained at any time during the hoisting operation.

The switch 143 is therefore provided with the contacts 243 (Figure 10) regulating a circuit controlling the operation of the motor.

The switch 141 is provided with contacts 141a included in the above mentioned circuit which contains the photocells.

The switch 142 however is provided with two pairs of contacts 242a, 242b the first pair of which is included in the above mentioned circuit, while the second pair cooperates with further contacts to be mentioned and described below.

Among the groups of switches arranged along the vertical stretches of the chain and operated by cams 140, 140a the switches 150 and 160 are the top and bottom limit switches. They are provided with contacts 290, 290a (Figure 10) at the inner side arresting the cages when they have reached the top and bottom position respectively. It will be understood that the two switches are capable of controlling both the top and bottom position in this case, on account of the coupling of the hoisting drums of the cages, which causes one cage to reach the bottom when the other reaches the top level. In Figure 10 these switches are shown as controlling lines 63, 64 and 65, 66 respectively. These switches may be provided with further contacts (not shown) controlling lamp circuits but it is preferable to control the indicator lamps by a further pair of switches, such as 145, 155 located at the upper end.

The switches 158, 159 and 148, 149 are each provided with a single contact pair 158a, 159a, 148a, 149a respectively controlling the circuits of indicator lamps 168, 169; 166, 167 indicating the position of the cage while travelling between the bottom landing and the ground landing.

The mercury switches 147 and 157 are provided with two pairs of contacts 147a, 157a; 240, 241 respectively and they form the ground landing switches determining the top limit for the cages when carrying persons. One pair of these contacts 240, 241 respectively, controls the circuits 57, 58; 55, 56 respectively which are operative when the cage is moved upwardly and when the hoist is effected with men at low speed. The other pair of contacts 147a, 157a controls indicating lamps 171, 172.

A further pair of mercury switches 146 and 156, carrying two pairs of contacts each is arranged for cooperation with the low speed switch 142. These switches are providing what is termed a floating limit approach control. The contacts of switch 146 are indicated at 151, 152 while the contacts of switch 156 are indicated at 153 and 154 in Figure 10. The contacts 152 and 153 are, as will be noted, in parallel to contacts 242a and their function is the following.

When one of the cages is approaching the top limits or bottom limits at too high a speed, so that the opening of the limit contacts would not stop the cages in time to prevent damage, the contact 242a of the switch 142 set for low speed will be open. The circuit of the master relay then remains closed over contacts 152, 153 in the parallel circuit. When, therefore, one of the switches 146, 156 is tilted by the cam 140 or 140a and one of the contacts 152 or 153 is opened the master relay circuit will be deenergized and the brakes will be applied as the energization of the system depends on the energization of the master relay 280 (Figure 9).

However the operator may slow down the speed of the cages when the cages approach the point at which the floating limit switches 146, 156 are arranged to a speed at which contacts 242a of switch 142 close. This is indicated by the opening of the second contact 242b of said switch which controls the pilot lamp 340 (Figure 10). When this pilot lamp becomes dark upon tilting of the switch so that the contacts 242a close, the operation of one of the switches 146, 156 will not affect the holding circuit through the master relay 280, connected with conductors 53 and 54, because the parallel circuit through 242a is kept closed.

The contacts 151 and 154 of the switches 146, 156 control a lamp circuit through lamp 350, which together with lamp 340 is located at the top of the safety device in a conspicuous position. These lamps are operative as long as the floating approach limit contacts are open. When, therefore the operator starts a cage down from the top to the bottom, he may not increase the speed of the cages, until the cage which travels downwardly has passed the position at which the said floating approach limit switches are located. If he would increase the speed before the above named position was reached the cages would come to a stop at the start of the descent. Therefore he has to keep the cage at low speed until the position corresponding to the location of one of the switches 146 and 156 has been passed. The closing and opening of the switches is indicated by the lamp 350. The speed can then be increased until the upwardly travelling cage reaches the floating approach limit switch. The speed has then to be reduced until lamp 340 goes out which indicates that the governor has operated switch 142 which has been brought into operative position and that its contacts 242 are now bridging the contacts 152 or 153.

The switches 145 and 155, arranged in the top position are provided with sets of contacts 145a, 155a which control the lamps 164, 165, 174, 175. Lamps 164 and 175 and 174 and 165 form parallel pairs which are energized together as the two cages are arriving simultaneously at the upper and lower limit respectively.

In addition to the above described arrangements a final or emergency limit circuit is arranged for preventing any accidental movement of the cages beyond the final limits of the run on the top and bottom. This emergency limit circuit is controlled by a photo cell 180 which receives a beam 188 emanating from exciter lamp 182. The beam is reflected by mirrors 183, 184, 185 along a path which has two horizontal stretches below and above the horizontal stretches of the chain 120.

The ray of the exciter lamp is normally not intercepted by one of the indicating pointers 186, 187. When however the pointers 186, 187 are moved beyond the top or bottom limits they intercept the horizontal stretches of the beam 188 and the relay 180a connected with the photocell 180 becomes deenergized and opens the normally closed contacts 180b of the circuit 59, 54. It will be seen from Figure 9 that the photo-electric cell 180 receives its energization directly over wires 67 and 68 leading to the transformer 210 over circuit 178, while the exciter lamp 182 receives its energization from the same conductors over circuit 179.

The said photo electric cell relay 180 when deenergized also operates a second armature provided with a pair of contacts 180c which close the circuit of the indicator lamp 352.

The above mentioned circuit 59 which is controlled by the contacts 180b may be traced on Figure 9 as follows. This circuit starts at 67 connected with the signal current supply transformer 210 and runs over wire 177, master relay 280, button 260 (pressed by the operator when starting operations) wire 189, dead man relay contacts 337a, then over 180b to wire 59 (Figure 9) over switch contacts 241 of switch 141, switch 113, wire 248 switch contacts 152 and 153 and wire 54 back to wire 68 and to transformer 210.

This circuit energizes the master relay 280. Breaking of this circuit, as will be seen below, stops the energization of all appliances and applies the brake.

The control of the motor and brake circuits is exercised by the following devices.

As already mentioned hand operated switches 205 and 214 (Figure 11) are placed near the operator for the admission of power to the installation and for the admission of power to the signal and control lines. These switches are of the usual type and need not be described. The coil shown near switch 205 in Figure 1 belongs to the customary overload safety appliances which need not be described.

Behind the switch 205 in the three phase power line a main forward and a main reverse contactor switch 208, 209 is arranged. These contactor switches close the lines 74, 75, 76 leading to the stator of the motor 220 (Figure 12) in such a way as to provide running in two different directions. They are both operated by solenoid coils 212 and 211 and an auxiliary switch 298, 298a is operated with them, closing the connection between lines 70 and 72.

The operation of all circuits, as has already been mentioned, is directly or indirectly controlled by the master relay 280 which operates five armatures and thereby performs the following functions.

It controls the solenoid coils 212 and 211 of the main contactors 208 and 209.

It controls the circuit leading to controller 190 operated by the hand of the operator. This circuit also controls the operation of the forward and reverse interlocking relays 235, 236.

It establishes a circuit through the foot treadle contact 320 thus permitting the operator to release the brakes without opening the controller.

Once operated by means of the hand operated push button at the beginning of the operation, it closes a locking circuit for itself which is controlled by the dead man control and by the final limit control as well as by other controls which require the stopping of all operations.

The speed selector relay 237 which is controlled by the call buttons 80, 81 . . . and also by the speed selection buttons 85, 86 in the operator's stand as well as by the relays 238, 239 described below is provided with six armatures which perform the following functions.

Its armatures e, f bridges the top limits 240 and 241 for the hauling of men controlled by switches 147 and 157. Its armature d bridges the contact 243 of governor operated switch 143 closed at low speed of the governor.

Its armature c closes a locking circuit for its own winding.

Its armature b exercises control over the contactor bank 255 of the motor which limits the speed of the motor 220 by insertion of resistances into its armature.

Its armature mainly exercises control over the indicator lamps 380, 381, 382, 383, etc. at the landing stations of the cage.

This relay, as above stated, is controlled by the two relays 238, 239 termed high speed and low speed relay, energized by circuits including the push buttons for high speed and low speed (man hauling and coal or ore hauling).

In addition a pair of two further control relays 235, 236 are provided termed forward and reverse interlocking relays each provided with five armatures.

The armatures of each of these relays close a locking circuit for the relay itself which has been energized but interrupt and lock out the energizing circuit for the other relay of the pair. The energization of each relay also interrupts the energizing circuit for the high speed and low speed relays 238, 239 and finally the forward interlocking relay when energized closes the circuit of the coil 212 of the forward main contactor 208 while the reverse interlocking relay closes the circuit of the coil 211 of the reverse main contactor 209.

Finally a brake control relay 300 controls a brake solenoid 310 which in its turn controls the valve 312 of a brake cylinder 314. An action retarding device 313 may be connected with the brake actuating mechanism in order to delay the action exercised by the solenoid in the desired manner. It is to be understood that the brakes are always applied and are only released upon energization of the relay 300.

The motor 220 may be of any desired type and for the sake of giving some kind of example an induction motor has been shown whose speed is controlled by resistances in the armature circuit which are cut in and out by means of coils in the contactor bank 255. The motor may however be of any type suitable for this type of work and its construction has no connection with this invention.

The three resistances 221, 222, 223 may be bridged at various points as indicated by the arrows by way of example, by means of contactor bars 258, 259, 358, 359, 458, 459, etc. which are forming part of a rotor controller and which are bridging series of contacts 277, 278 . . . leading to tapping points of the resistances 221, 222, 223. These contactor bars are moved into and out of engagement with said contacts by the solenoid coils 256, 257, 248, 251, 252, 253, 254. Operation starts by the energization of one of the coils, say, 256 and each coil closes the energizing circuit for the next coil. Therefore the bridging progresses automatically and in timed relation and the arrangement is equivalent to an automatic controller with a timed step by step action. However, one of the coils (248 in the example shown) is provided with an energizing circuit, which is not only closed by a contact operated by the preceding coil but which is also controlled by the selector relay 237 by means of conductors 245, 246 leading to the armature b of this relay.

Therefore the bridging of the rotor resistances can only progress to this point when low speed is desired and relay 237 is not energized. The speed of the motor is thus limited. However if high speed is desired the circuit of coil 248 is closed by relay 237 and the coils 251, 252, 253 and 254 can therefore eliminate the rotor resistance completely in a step by step fashion, bringing the motor to its maximum speed.

It will be understood that this regulation of the motor in itself is essentially a standard method of regulation which has only been changed or adapted for purposes of the invention insofar, as the energization of some of the coils (256, 248) is controlled by the safety arrangement.

The remaining part of the equipment will best be described in connection with the operation of the device.

For operating the equipment as shown in Figures 9, 10, 11 and 12, on a three phase power line 200, 201, 202 the operator has to close main switch 205, by means of handle 206 (Figure 11), thus supplying power to the forward contactor 208 and reversing contactor 209, which are controlled by relay coils 212, 211 operated in a manner described below. As will be seen the closing of either contactor 208 or contactor 209 connects the supply wires 74, 75, 76 of the hoist motor 220 driving the drums with the supply wires, this connection being such that the motor rotates in either of the two directions of rotation according to the contactor which has been closed by one of the coils 212, 211.

The closing of switch 205 connects transformer 210 with the supply line, the said transformer being the main supply for the indicator and control currents.

The operator then closes main control switch 214 which controls the secondary of the transformer and occupies his seat or stand so that he intercepts the ray of the dead man control 215. He then presses button 260 making the circuit of the master relay and thereby the hoist ready for operation.

The speed selection is made automatically by the operation of the call buttons. As has been described call buttons 80, 81, 82, 83 . . . have been placed on the bottom landing, ground landing and on any other place on which the cage may make a landing.

If the call button 80 at the bottom, for instance, is pressed the operator is notified that a cage should be sent down to take either supplies or persons, but this button also sets the speed of the cage and in this case as an empty cage is sent down, the cage is set for high speed for the downward journey.

This is accomplished by means of the speed selector relay 237 which is energized and is set for high speed operation. This setting is obtained by the energization of high speed pilot relay 238 which controls the energizing circuit of relay 237. The circuit for pilot relay 238 is the following: secondary of transformer 210, conductor 67 (Figure 11) conductor 67 (Figure 9) conductor 77, 267, conductor 269, button 80 which has been pressed and over lower contacts of said button, conductor 270, contact arms b of relays 235 and 236, pilot relay 238 and conductor 268, to 68 (Figure 9) and over 68 (Figure 11) back to transformer 210.

Relay 238 attracts its armature and closes a branch circuit 232 branching off from 267 and 268 and including relay 237 and the contacts of relay 239.

When speed selector relay 237 is energized the contacts 240, 241 of switches 147, 157 are bridged by armatures e and f of relay 237 and by conductors 55, 56, 57, 58 (Figures 9 and 10). These contacts are therefore not operative in order to permit one cage to go above the ground landing while the other cage goes down.

Likewise the armature d by means of conductors 61, 62, Figure 9, short circuits the contacts 243 of governor controlled low (man hauling) speed switch 143. The speed at which the cage approaches the bottom is therefore set by the second switch 142 and the floating contacts as above described.

It will be noted that the closing of armature b of relay 237 closes the circuit of the controller coil 248. This coil may therefore be operated by the preceding coil so that cutting out of resistances in the rotor of the hoist motor may proceed to the last coil, thus producing full speed conditions in said motor.

It will also be noted that the button 80 has further contacts (the upper pair in Figure 9) which are likewise connected with the supply conductor 269. They close a circuit 261, including the signal bells 262, which is connected with the two supply wires 269, 268. Therefore the bell will strike once each time a button is pressed, whereby the operator and other persons on the landing platform are informed that the cage has been called.

It is now up to the operator to select a car and to send it to the bottom landing. On the indicator dial he can see what cage is nearest to the landing from which the call was issued and then he operates the controller 190 setting it on the first segment of forward or reverse according to the cage which he wants to send to the calling platform. Assuming that the controller 190 was set to the first forward position in which contacts A, I, E are in contact with G, H, K, a circuit is closed through the forward interlocking relay 235 which may be traced as follows: conductor 67 (Figure 9) which as previously explained is energized from the secondary of transformer 210 (Figure 10), conductor 77 to armature e of master relay 280, which as above stated was energized upon pressing of the button 260, and along 281 to the fixed controller contact A, from there to the first forward contact G, through the controller over H and I to conductor 282, to the junction point 283, to 284 which leads to the loop formed by armature e of relay 237, through the loop to 285 to the junction point of 285 and 63, through 63, Figure 9, to 63 (Figure 10) over limit contact 290 of switch 150 (Figures 3 and 4), conductors 64 (Figure 10) and 64 (Figure 9) over armature d of relay 236 through relay 235. The circuit is then closed through 287, junction point 288 armature d of (energized) relay 237, conductor 62, conductors 70, conductor 68 (Figure 9) and back to the secondary coil of 210 (Figure 11).

Therefore relay 235 is energized and performs the following functions.

By means of armature e a locking circuit is closed branching off from 281 and leading over 289 to armature *e* of relay 235 and over 295 to contact E of the controller. From there the circuit is from E to K to H to I and from I it follows the path already described. This locking circuit is arranged for safety purposes and especially provides for the case of a power failure in which the power supply returns while the controller 190 is open.

By means of armature *d* the second or reverse interlocking relay 236 is cut out as long as 235 is energized.

By means of armature *c* the circuit through auxiliary relay 239 is opened. Thereby the hoist operation can no longer be changed from low speed to high speed or vice versa by the pressing of call buttons while the hoist is in motion and the controller is in operative position. This, as will be clear, is an important safety feature.

By means of armature *b* the circuit through 238 is opened thereby also preventing any change from low speed to high speed or vice versa.

By means of armature *a* a circuit through the coil 212 of forward contactor 208 is closed thereby closing said contactor. This circuit runs from 68 over *d* of 290, 296, armature *a* of 235, 71 (Figure 9) 71 (Figure 11), 212, 69 (Figure 11), 69 (Figure 9) 67 to secondary of transformer 210 (Figure 11).

The closing of the contactor 208 supplies power from the phase conductors 200, 201, 202 to the cable 74, 75, 76 leading to the stator of motor 220.

As above stated switch 298 is closed with the closing of contactor 208. Thereby a circuit over the brake control relay 300 is closed, running from 67 over 77 and 299 the relay 300, conductor 301 to 72 and over 72, 298, 70 and 68 to the secondary transformer coil 210.

The energizing of the brake control relay 300 now produces energization of the brake valve solenoid 310 by means of armatures *a* and *b* which control the two branches 303 and 304, branching off from 267 and 268 respectively and leading directly to the solenoid 310.

When the brake solenoid 310 is energized the air or steam valve controlling the brake is rotated or shifted from the position in which it applies the brake to the position in which it releases the brake.

The brake control relay may however also be controlled when the contactor and the controller are both open by means of a foot contact or treadle 320 which closes a circuit branching off from 69 and runs over 70, 319, 320, 318 armature *c* of master relay 290, coil 300 and 299 back to conductor 67 and the transformer secondary.

When the auxiliary switch 298 of the main contactor 208 is closed a circuit is also closed over conductor 72 energizing coil 256 of the automatic rotor controller. This circuit runs from 67 (connected with 210) over 77, 87, coil 256, 72, 298 and 70 to 68 (connected with 210). Coil 256 attracts its bar 358 and bridges the first group of tapping contacts. Simultaneously it closes the circuit of coil 257 which attracts its bar 259, bridging a second group of tapping contacts and closes the circuit of coil 248. The circuit of coil 248 runs over 67, 77, 87 and the contact controlled by 257 over 246, the contacts of armature *b* of relay 237 which are now closed and over 245 to 248 and 72, and over 298 to 70 and 68. Therefore coil 248 attracts bar 258, bridges a further set of resistance tapping contacts and closes the circuit of coil 251. The energization of the coils and the bridging of the resistances continues until the last coil 254 has been reached which by means of bar 359 and the contacts bridged by it cuts out the armature resistance completely thus bringing the motor to its highest speed in a timed step by step manner.

When the empty cage has arrived at the bottom of the shaft it is automatically stopped by the opening of the bottom contact 290 which is included in the circuit of relay 235.

The relay 235 is thereby deenergized and breaks the circuit of contactor coil 212 at its armature *a*. Thereby the current energizing the motor through wires 74, 75, 76 is cut off.

When one cage arrives at the bottom the other cage simultaneously arrives at the uppermost level. This cage will operate switch 155 which simultaneously closes the two circuits of lamps 175 and 164. This circuit runs from 67 (connected with 210) to 53 contacts 155*a*, lamp 175 to 52 and 68 (connected with 210). Simultaneously a branch from 53 over 155*a*, lamp 164 and 52 is closed. The two lamps 175 and 164 therefore indicate arrival of the cages in their top and bottom positions to the operator. The operator thereupon puts his controller at rest.

Assuming now that men are using the cage which has been brought down and are pressing the button 81 to go up to the upper level at low speed. The pressing of button 81 closes a circuit from 210 to 67, 77, 267, 269, lower contact of 81, 271, contacts *c* of relays 235 and 236, 273, 239, 268, 70, 68 to 210.

Relay 239 energizes and breaks the circuit through selector relay 237, thus removing the bridges over the limit contacts at ground level 240 and 241. These contacts therefore remain operative.

The pressing of button 81 also operates the indicator lights 391, thus providing a signal for the operator and for others that men are going up now at low speed. The operator therefore puts his controller on the first step (according to the assumption made this is now the first reverse step) and thereby relay 236 is energized. The circuit is as follows: 67 (Figure 9) connected with 210 (Figure 11) 77, *e* of relay 290, 281A, B, C and D of controller 274, 275, 57, top limit contact for men 240, 58, 276, 65, bottom limit contact 290*a* for the other cage, 66, contact *d* of 235, relay 236, 287, junction 288, 61, low speed contact 243 of low speed control switch 143, 62, 70, 68 (connected with 210).

If the speed of the cage should exceed the limit set by the governor operated switch 143 the circuit of relay 236 would be opened bringing the cage to a standstill as above explained.

Relay 236 controls circuits which are otherwise analogous to those described in connection with relay 235. It may only be mentioned that contact *a* of relay 236 closes the circuit of coil 211 over lead 73, this circuit running from 67 (connected with 210) over 77, 69, 211, 73, armature *a* of 236, armature *a* of 290, 277, 70 to 68 (connected with 210).

Therefore contactor 209 is closed energizing the stator of the motor so as to operate in reverse direction.

Simultaneously with the operation of 209, 298*a* is operated closing a circuit from 67, over 77, 87. Coil 256 closes its contacts by means of bar 358 and also closes the circuit of coil 257 which closes its contacts by means of bar 259 and also closes the energizing circuit of coil 248 which in this case is however open at armature *b* of relay 237 which has not been energized during low speed action. Therefore a major portion of the resistance remains in the armature circuit and the motor operates at low speed. The brake relay 300 is energized, as before described, when switch 298a is closed.

When the cage arrives at the ground level which is the top level for the transportation of men, the energizing circuit of relay 236 is interrupted at contact 240, armature a falls back, coil 211 is deenergized and contactor 209 and contact 298a opens. The hoist motor 220 is thus deenergized and the cage stops.

The operation of the indicator lights will be clear without specific description.

When the operator wants to set the speed of the cage to move it without receiving a call, he has to press one of the buttons 85, 86 which are in front of his stand. The pushing of the high speed button and the setting of the controller for the intended motion will produce an operation which corresponds exactly to the operation above described. These buttons are also used for return signals.

Figures 7 and 8 and Figures 13, 14, 15 and 16 show a modification of the system and of certain of its elements as above described adapted for a steam operated hoist and for a single phase current or D. C. current supply.

As will be seen from Figure 16 the switch 205 comprises merely two levers and in the case of D. C. the transformer is dispensed with and the conductors 31, 32, corresponding to conductors 67, 68 in Figure 9 are directly connected with the incoming line 29, 30.

Likewise a single main contactor 225 is provided operated by coil 216. It is provided with the auxiliary switch 217 operated simultaneously with the main switch. The coil 216 is operated by a circuit connected with lines 25, 28 which correspond with lines 69, 71 in Figure 11.

The lines 29, 30 lead to the solenoid coils 229, 230 of a steam valve in the manner described below.

The controller 199 which is operated by the operator has in this case its reversing lever 317 mechanically connected with the steam reverse lever diagrammatically indicated at 318 and further contacts 314 on said controller operated by lever 315 are mechanically connected to the steam throttle diagrammatically indicated at 316 operated by the operator.

For operating the steam engine at high and at low speed an electromagnetically operated valve is used which is shown in detail in Figures 7 and 8. This valve comprises a cylindrical casing 360 provided with transverse tubular flanged connections 361, 362 and closed by cover pieces 363, 364. In the interior of the cylindrical casing two cylindrical valves 365, 366 are rotatable. The outer cylinder valve 365 is the high speed cylinder valve and is provided with openings 375 adapted to open the passage fully or to close it fully. The valve body has the shape of a hollow cylinder, closed at one end and is adapted to rotate within the cylindrical casing 360. It is provided at its closed end with a projecting shaft 367 passing through the cover 363 to the outside in a steam tight manner. On the shaft 367 a crank lever 368 is attached. This lever either by means of a link or by means of a slot and pin connection is connected with a piston rod 369 which forms part of the core 370 of the solenoid 229.

In the interior of the hollow cylindrical valve 365 the second cylindrical valve 366 is arranged. This valve is provided at one end with a short trunnion 373 which enters into a cylindrical bore 374 in the closed end of valve 365 and is guided and supported therein. At the other end the valve cylinder is provided with a shaft 376 passing through the lid 364 in a steam tight manner and carrying a crank lever 377. This lever engages a piston rod 378 in the way already described in connection with members 368 and 369. The piston rod forms part of or is connected to the core 379 of solenoid 230.

The low speed valve 366 is provided with a passage which may be aligned with the valve passage through 361 and 362. It will block about one half of the cross section for the passage of the steam in its closing position when its solenoid is deenergized, but it will free the passage completely when its solenoid is energized.

The high speed valve 366 closes the passage of steam through the valve completely when its solenoid is deenergized and opens it completely when its solenoid is energized.

It will therefore be seen that energization of solenoid 229 operating the high speed valve will set the steam engine for low speed as the low speed valve still blocks about half of the passage if deenergized. Merely operation of both solenoids sets the engine for high speed. Thereby an additional safety measure is gained. It would not be possible to operate the hoist at high speed after calling for low speed, even if a failure occurred in the circuit of the slow speed valve. Moreover power failure sets the solenoid back in such a way that a return of power will not produce high speed if slow speed has been called for.

It will also be understood that the valves do not replace the hand throttle, but are arranged in the pipe or duct leading from the throttle to the engine. They may be open but no steam flows to the engine, unless the operator moves his throttle.

The operation is very nearly the same as that already described; it is therefore only necessary to give an abbreviated description.

Assuming again that the operator has set all his controls as aforedescribed and has seated himself to make the hoist ready for operation, and assuming further that the cages are in some intermediate position and that a button 80 at the bottom landing is pressed to bring one of the cages down. Thereby as before described the operator receives a signal and the system is set for high speed.

The signal is received over lines 31 and 32, connected with the main lines 29, 30 (Figure 16) when switches 205 and 204 have been closed by the operator at the start over 23 (Figures 15 and 13), 37, 21 (Figures 13 and 15) upper contacts of button 80, 261, bell 262, 20, 24.

The lower contact of the button 80 closes the branch circuit leading from 21 (see the above circuit) over 19 (Figures 15 and 13), armatures b of relays 235 and 236, 39 and high speed relay 238 to 20 and 24. Relay 238 now closes energizing relay 237 which locks itself and bridges contacts in the manner described in connection with the modification shown in Figures 9 and 12.

The high speed lamps 380, 382 . . . will be energized by a circuit branching off from the bell circuit (connected with 20 and 24) and including lamps 380, line 17 (Figures 15 and 13) armature a of relay 237 (now energized), 37 to line 23, lamps 382 and the other lamps are connected in parallel circuits and light up simultaneously.

The operator now sets his controller on first point moving handle 317 and 315 and handle 316 and 318. The steam throttle is thereby opened and the steam reverse lever 318 is set together with the controller forward or reverse. When the operator selected the forward side he closes a circuit including relay 235 which may be traced as follows 23, contact d of 280, 319, M—Q—P—L—N—R—O—320D—G—H—E—321—1—e of 237—2—9—290—10—d of 236—235—287—d of 237—390—391 to junction point 392 and 24 (connected with the main line 30).

Relay 235 is energized and energizes coil 216 over a circuit traceable over 29—31—23—25—216—28—a of 235—392—c of 280—393—24—32—30.

Contactor 225 therefore closes, energizing both solenoids 229 and 230, the former over 29—30, the latter over 30—230—394—b of 237—395—29.

When both solenoids are operated the steam engine operates at high speed. Likewise auxiliary contactor 217 operates the brake relay 300 as described.

The locking circuit of 236, the cutting out of relay 236 and also of relays 238, 239 and other features are essentially identical with those already described.

Likewise the arresting of the cage when arriving in its bottom position, the operation of the signal lights and other operations are essentially identical with those above described in connection with the modification shown in Figures 9–12. Only instead of cutting out the current for the motor, the circuit through 229 and 230 is cut setting the valves into their normal position in which the steam is cut off and the brakes are applied by the opening of auxiliary switch 217 breaking the circuit of the brake relay 300.

Let it now again be assumed that a cage is used in the forward direction for the transportation of men from the bottom. In this case the men on the level of the cage press button 81 thus setting the connections for low speed, as above explained, over the following circuit 31—23—37—21 lower contact of 81—18—c of 235 and 236—40—239—20—24—32—30. Relay 239 deenergizes relay 237 (if energized). The operation in other respects is again the same as described in connection with the modification shown in Figures 9–12.

The operator moves the reverse lever for the required direction and then sets his controller on first contact point operating with it the steam throttle. Thereby relay 235 is energized over the following circuit 29—31—23—d of 280—319—M—Q—P—L—N—R—O—D—G—E—321—1—241—2—9—10—e of 236—235—287—7—243—8—391—392—24—32—30.

Relay 235 locks itself in the manner already described and energizes coil 216 in the described manner. Main contactor 225 is therefore closed and solenoid 229 is energized. However solenoid 230 remains deenergized as its circuit is broken at contact b of relay 237 which is now deenergized. The brake is operated as described in connection with the high speed operation.

As low speed valve now throttles the steam the engine can only run at low speed.

In other respects the operation is the same as already described and will be understood without further description.

From the foregoing it will be clear that the above described safety system will provide full safety against errors and faulty manipulation, that it will effectively guard against damage and accident due to overspeeding or to overrunning of the proper positions and that it provides a simplified manipulation which will greatly relieve the strain put upon the operator by the necessity to initiate series of different types of transport.

It will also be clear that departure from the examples described especially in unessential matters will not in any way affect the invention.

Having described the invention, what is claimed as new is:

1. A safety control system for mine hoists, comprising cages, adapted to be moved to a plurality of positions, drums for hoisting said cages, driving means for the aforesaid drums, an automatic safety controller and indicator positively driven by the drums for hoisting the cages, including an endless chain, reproducing exactly the movement of the cages, limit switches for controlling the movement of said cages to and beyond their end positions near said chain, a member carried by said chain for operating said switches, means controlled by the speed of the moving cages, switches controlled by the aforesaid means, and floating approach control switches cooperating with said speed control switches for controlling the speed of approach of the cages to the limit positions.

2. A safety control system for mine hoists, comprising cages, adapted to be moved to a plurality of positions, drums for hoisting said cages, driving means for the aforesaid drums, an automatic safety controller and indicator positively driven by the drums for hoisting the cages, including an endless chain, reproducing exactly the movement of the cages, limit switches for controlling the movement of said cages to and beyond their end positions near said chain, a member carried by said chain for operating said switches, means controlled by the speed of the moving cages, and a plurality of switches simultaneously controlled by the aforesaid means and operated in succession at different speeds by said speed controlled means.

3. A safety control system for hoists, comprising cages, drums for hoisting said cages, driving means for said drums, an automatic safety controller and indicator including an endless chain, with two parallel stretches, means for coupling said chain with said drums, to reproduce the movement of the cages by the movement of the chain, cam members carried by said chain, a group of tilting switches in proximity to each of the parallel stretches of the chain, operated by cam members, said switches controlling the driving means of said drum, some of the tilting switches of said group operated by the chain being placed in limit positions corresponding to the end positions of the cage for hoist movement, further switches operated by the chain operating indicators indicating the position of the cage in the shaft, a group of further tilting switches, a centrifugal governor operated by the drums for operating said last named switch group, said switches being arranged for successive operation at different speeds, and means for making said switches alternatively operative.

4. A safety control system for hoists comprising cages, drums for hoisting said cages, driving means for said drums, an automatic safety controller and indicator, including an endless chain with two parallel stretches, means for coupling said chain with said drums, to reproduce the movement of the cages, a master control circuit, controlling said driving means for said drums, a photocell and relay controlling said master control circuit, a beam producing means for exciting the photocell, means for passing said beam along the parallel stretches of the chain and means carried by said chain for intercepting said beam when the cage overruns its end positions.

5. A safety control system for hoists comprising cages, drums for hoisting said cages, driving means for said drums, an automatic safety controller and indicator, including an endless chain with two parallel stretches, means for coupling said chain with said drums, to reproduce the movement of the cages, an operator's stand including means for operating said driving means at different speeds, a master control circuit controlling said driving means for said drums, a photocell and relay controlling said master control circuit placed on one side of the operator's stand, a beam producing means for exciting the photocell, placed on the other side of the operator's stand, the beam being intercepted by the operator when on his stand, said cell relay and cell exciting beams forming a dead man control for the mine hoist.

6. A safety control system for mine hoists, comprising cages, adapted to be moved to a plurality of positions, drums for hoisting said cages, driving means for the aforesaid drums, an automatic safety controller and indicator positively driven by the drums for hoisting the cages, including an endless chain, reproducing exactly the movement of the cages, limit switches for controlling the movement of said cages to and beyond their end positions near said chain, a member carried by said chain for operating said switches, means controlled by the speed of the cages, and further switches controlled by the aforesaid speed controlled means for controlling the movement of the cages, a master control circuit, controlling said driving means for said drums, landing platforms for the cages, a plurality of call buttons at said landing platforms corresponding to different types of hoist operations performed under different speed and limit position conditions, switches associated with said buttons, and control circuits operated by said switches for automatically selecting the limits and speeds corresponding to the selected type of hoist operations.

7. A safety control system for mine hoists, comprising cages, adapted to be moved to a plurality of positions, drums for hoisting said cages, driving means for the aforesaid drums, an automatic safety controller and indicator positively driven by the drums for hoisting the cages, including an endless chain, reproducing exactly the movement of the cages, limit switches for controlling the movement of said cages to and beyond their end positions near said chain, a member carried by said chain for operating said switches, means controlled by the speed of the moving cages, and a plurality of switches simultaneously controlled by the aforesaid means and operated in succession at different speeds by said speed controlled means, landing platforms for the cages, a plurality of call button switches at said landing platforms, an operator's stand and further button switches at said operator's stand, said button switches corresponding to different types of hoist operations performed at different speeds with different limit positions for the movement of the cages, selector circuits associated with said button switches, a selector relay in said circuit, said relay cutting out the limit switches not required for the selected type of hoist operation, while including into the selector circuits the speed control switches for the speed corresponding to the selected type of hoist.

8. A safety control system for mine hoists, comprising cages, adapted to be moved to a plurality of positions, drums for hoisting said cages, driving means for the aforesaid drums, an automatic safety controller and indicator positively driven by the drums for hoisting the cages, including an endless chain, reproducing exactly the movement of the cages, limit switches for controlling the movement of said cages to and beyond their end positions near said chain, members carried by said chain for operating said switches, means controlled by the speed of the moving cages, and a plurality of switches simultaneously controlled by the aforesaid means and operated in succession at different speeds by said speed controlled means, a master control circuit controlling said driving means for said drums, a master control relay in said master control circuit, an energizing circuit for the same, closed by hand, a locking circuit for said relay, holding the same in operative position when energized, said locking circuit including all the control switches entailing stopping of operation upon transgression of the position limits and speed limits.

9. A safety control system for mine hoists, comprising cages, adapted to be moved to a plurality of positions, drums for hoisting said cages, driving means for the aforesaid drums, an automatic safety controller and indicator positively driven by the drums for hoisting the cages, including an endless chain, reproducing exactly the movement of the cages, limit switches for controlling the movement of said cages to and beyond their end positions near said chain, members carried by said chain for operating said switches, means controlled by the speed of the moving cages, and a plurality of switches simultaneously controlled by the aforesaid means and operated in succession at different speeds by said speed controlled means, landing platforms for the cages, an operator's stand, a plurality of call button switches at the landing platforms, and a plurality of button switches at the operator's stand, said button switches corresponding to different types of hoist operations performed at different speeds and with different limit positions for the movement of the cages, a selector circuit connected with said button switches, a selector relay in said circuit, means for energizing said selector relay including a high speed and a low speed relay, armatures connected with said selector relay, said selector relay armatures cutting in the speed control switches required for the selected type of hoist and making inoperative the circuit switches not required for the selected type of hoist.

10. A safety control system for mine hoists, comprising cages, adapted to be moved to a plurality of positions, drums for hoisting said cages, driving means for the aforesaid drums, an automatic safety controller and indicator positively driven by the drums for hoisting the cages, including an endless chain, reproducing exactly the movement of the cages, limit switches for controlling the movement of said cages to and beyond their end positions near said chain, members carried by said chain for operating said switches, means controlled by the speed of the moving cages, and a plurality of switches simultaneously controlled by the aforesaid means and operated in succession at different speeds by said speed controlled means, an operator's stand, a hand operated controller for regulating the speed of the driving means and for reversing the direction of movement or said stand, speed selecting button switches in said stand, landing platforms for the cages and speed selecting call buttons on said landing platforms, selector circuits associated with said speed selecting buttons, high speed and low speed relays in said circuits respectively, a selector relay operated by the operation of one of said relays, interlocking relays for forward and reverse movement of the driving means for the cages, said relays controlling the connection with the selected section of the hand operated controller, said selector relay being provided with armatures cutting in the speed control switches required for the selected type of operation and making inoperative the limit switches not required for the selected type of operation.

11. A safety control system for mine hoists, comprising two connected cages, adapted to be moved into and between a plurality of positions, drums for hoisting said cages, driving means for said drums, a main circuit controlling said driving means, an automatic safety controller and indicator driven by the drums and including an endless chain, with two parallel stretches reproducing exactly the movement of the cages, limit switches for controlling the movement of the cages, arranged along said switches, a member carried by each of the parallel stretches of the chain for operating said limit switches, a master circuit including a master relay, a main contactor in the main circuit controlling the driving means, a solenoid coil for operating said main contactor, an interlocking relay, an energizing circuit for the solenoid, controlled by said interlocking relay and means for controlling the interlocking relay, said means including a selector relay, means for energizing the same and means controlled by said relay for selecting the speed control means and the limit switches in operation for the selected hoist.

12. A safety control system for mine hoists, comprising cages, adapted to be moved to a plurality of positions, drums for hoisting said cages, driving means for the aforesaid drums, an automatic safety controller and indicator positively driven by the drums for hoisting the cages, including an endless chain, reproducing exactly the movement of the cages, limit switches for controlling the movement of said cages to and beyond their end positions near said chain, members carried by said chain for operating said switches, means controlled by the speed of the moving cages, and a plurality of switches simultaneously controlled by the aforesaid means and operated in succession at different speeds by said speed controlled means, a master control circuit controlling said driving means for said drums, a master control relay in said circuit, a holding circuit for the same, a brake relay controlled by the master relay, a brake solenoid controlled by the brake relay and a brake normally applied to the hoist drums and released upon operation of the brake relay.

13. A safety control system for hoists comprising cages, drums for hoisting said cages, driving means for said drums, an automatic safety controller and indicator, including an endless chain with two parallel stretches, means for coupling said chain with said drums, to reproduce the movement of the cages, said means including a chain, a feeler resting on said chain and held by its tension, a switch connected with said feeler, a master control circuit controlling the driving means for said drum, a master control relay, an energizing and a holding circuit for the same, said locking circuit including the switch associated with the feeler.

14. A safety control system as claimed in claim 11, with pedal and a contact operated near the operator, a separate circuit controlled by the pedal contacts for the main contactor device, for making inoperative the limit switches at the ground landing for the up going cage when a cage connected with this cage is going downwardly at full speed.

15. A safety control system for mine hoists, comprising cages, adapted to be moved to a plurality of positions, drums for hoisting said cages, driving means for the aforesaid drums, including a steam engine, steam valves for controlling said engine, said valves being adapted to supply steam for high and low speed operation, an automatic safety controller and indicator including an endless chain, with two parallel stretches, means for coupling said chain with said drums, to reproduce the movement of the cages by the movement of the chain, cam members carried by said chain, a group of tilting switches in proximity to each of the parallel stretches of the chain, operated by cam members, said switches controlling the driving means of said drum, some of the tilting switches of said group operated by the chain being placed in limit positions corresponding to the end positions of the cage for hoist movement, further switches operated by the chain operating indicators indicating the position of the cage in the shaft, a group of further tilting switches, a centrifugal governor operated by the drums for operating said switch group, said switches being arranged for successive operation at different speeds, means for making said switches alternatively operative, and means controlled by said selector relay for controlling the high speed and the low speed valve.

16. A safety control system as claimed in claim 15 wherein the control valve consists of two cylindrical concentric valves, each provided with a separate driving mechanism, one of said valves adapted to block and to free the valve passage alternatively and one of said valves adapted to block and free alternatively a portion of the valve passage.

17. A safety control system as claimed in claim 15, wherein the means for controlling the high speed and low speed valve consists in solenoid, energizing circuits for the same connected for alternative energization of either one or both of said solenoids, concentric control valves, each provided with a separate driving mechanism and each driving mechanism being operated by one of the solenoids, one of said valves adapted to block and to free the valve passage alternatively and one of said valves adapted to block and free alternatively a portion of the valve passage.

18. A safety control system as claimed in claim 1, wherein indicator lamps are connected with the switches operated by the chain.

RALPH H. STEWART, Jr.
HARVEY T. STEWART.

REFERENCES CITED

The following references are of record in the file of this patent:

UNITED STATES PATENTS

| Number | Name | Date |
| --- | --- | --- |
| 1,910,204 | Eaton | May 23, 1933 |
| 2,178,071 | Eames | Oct. 31, 1939 |